United States Patent [19]

Andersson et al.

[11] Patent Number: 4,741,491
[45] Date of Patent: May 3, 1988

[54] REEL FOR VEHICLE SAFETY BELT

[75] Inventors: Tommy Andersson, Alingsas; Lars Y. Haland, Flasterbo, both of Sweden

[73] Assignee: Autoliv Development AB, Vargarda, Sweden

[21] Appl. No.: 875,842

[22] Filed: Jun. 18, 1986

[30] Foreign Application Priority Data

Jun. 28, 1985 [GB] United Kingdom ............... 8516449

[51] Int. Cl.$^4$ ............................................. B60R 22/34
[52] U.S. Cl. ..................... 242/107.4 R; 242/107.4 A; 242/107.4 B
[58] Field of Search ............... 242/107.4 A, 107.4 B, 242/107.4 R; 280/806, 807, 803; 297/477, 478

[56] References Cited

U.S. PATENT DOCUMENTS

| | | | |
|---|---|---|---|
| 3,797,603 | 3/1974 | Loomba | 242/107.4 R X |
| 3,908,928 | 9/1975 | Okada | 242/107.4 R |
| 3,942,740 | 3/1976 | Torphammar et al. | 242/107.4 B |
| 3,944,163 | 3/1976 | Hayashi et al. | 242/107.4 D X |
| 4,083,512 | 4/1978 | Rumpf | 242/107.4 B X |
| 4,531,687 | 7/1985 | Andersson | 242/107.4 B X |

Primary Examiner—John M. Jillions
Attorney, Agent, or Firm—Spencer & Frank

[57] ABSTRACT

A retractor reel assembly for vehicle safety belt has a rotatable reel which automatically winds in the safety belt when it is not in use, and has a locking arrangement, which is normally in the locked condition. A sensor senses the acceleration or deceleration of the vehicle and the locking means are adapted to be released in response to the withdrawal or attempted withdrawal of a length of safety belt when the acceleration or deceleration of the vehicle is within a predetermined limit. If the acceleration or deceleration of the vehicle is outside the predetermined limit the reel is retained in the locked condition.

12 Claims, 3 Drawing Sheets

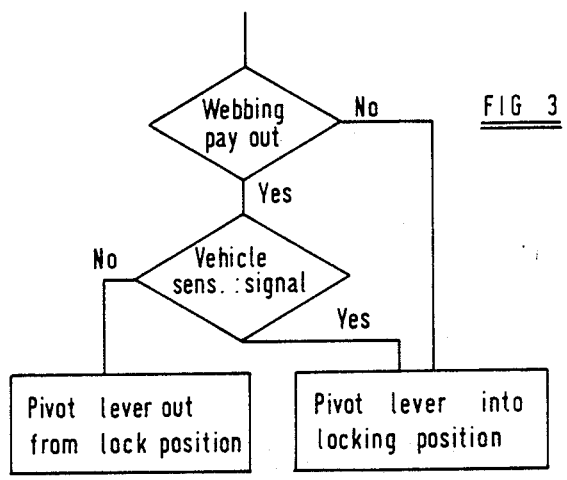
FIG 3
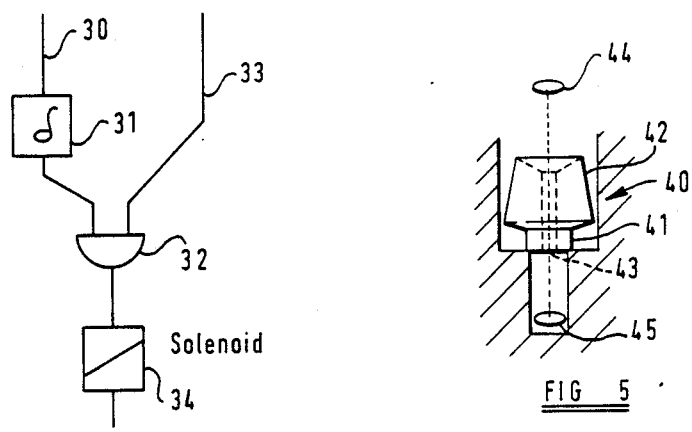
FIG 4
FIG 5

REEL FOR VEHICLE SAFETY BELT

BACKGROUND OF THE INVENTION

1. Field of the Invention

The present invention relates to a reel for vehicle safety belt and more particularly to a reel for vehicle safety belt of the type in which a rotatable element is adapted automatically to wind the seat belt when it is not in use, the reel also being provided with means to prevent rapid extraction of the belt, especially under accident conditions.

2. Discussion of the Prior Art

Modern safety belts in vehicles, particularly motor cars, are provided with a spring loaded reel comprising a winding spindle, which is arranged in a housing, onto which part of the safety belt is automatically wound when the safety belt is loose. Such safety belts are normally provided with a device for locking the winding spindle so that the safety belt cannot be extracted if the vehicle is suddenly accelerated or decelerated, or if the vehicle turns sharply. Normally the locking device is also such that the safety belt cannot be extracted rapidly, even if the motor car is at rest or moving relatively smoothly or slowly.

It will be appreciated that the prior-proposed safety belt reels have been designed so that a passenger wearing the safety belt can move forwardly relatively easily when not under accident conditions, but are such that the person wearing the safety belt is firmly retained in position when an accident occurs.

It will be appreciated that the spindle of the above-described prior proposed type of retractor reel is normally in an unlocked condition, and is only placed in a locked condition when accident conditions or potential accident conditions are detected either due to a rapid acceleration or deceleration of the vehicle, or due to the safety belt being withdrawn at a relatively high speed.

Many of the prior proposed seat belts have incorporated a control wheel having a toothed periphery. A sensor is provided adapted to sense the acceleration or deceleration of the vehicle in excess of a predetermined limit. When such an acceleration or deceleration is sensed a locking pin or the like is brought into engagement with the toothed periphery of the wheel thus preventing rotation of the wheel. When the seat belt is then paid out the wheel is prevented from rotating, which actuates a locking mechanism to prevent any further length of the seat belt from being paid out.

Such a mechanism also frequently has a "inertia" device so that, if the seat belt is withdrawn rapidly from the reel, again the locking arrangement is actuated to prevent any further length of seat belt being paid out.

One disadvantage with the prior art arrangement is that if the toothed wheel is rotating when an accident occurs, whilst the sensor may sense an acceleration or deceleration in excess of the predetermined limit, it may not be possible to inset the locking pin satisfactorily into the toothed periphery of the wheel to cause the wheel to stop rotating.

BRIEF SUMMARY OF THE INVENTION

According to this invention there is provided a retractor reel assembly for vehicle safety belt comprising rotatably mounted means adapted automatically to wind a safety belt in when the safety belt is not in use, means for locking said winding means, to prevent the safety belt from being paid out, said locking means normally being in the locked condition, means to sense the acceleration or deceleration of the vehicle, and means to release the locking means in response to the withdrawal or attempted withdrawal of a length of safety belt from the reel, the arrangement being such that the locking means are released only when the acceleration/deceleration of the vehicle is within predetermined limits.

Preferably a sensor is provided adapted to sense the tension applied to the belt during attempted withdrawal of the belt.

Conveniently the winding means are normally locked rigidly in position to prevent the withdrawal of any belt from the retractor reel.

Advantageously when said locking means are in the normally locked position it is possible for the retractor means to move by a limited extent to permit a short length of safety belt to be paid out.

Conveniently a sensor is provided which is responsive to the paying out of said short length of belt.

Preferably said sensor means determine the speed and/or acceleration of the belt when it is withdrawn from the reel and are responsive to a withdrawal of the belt within predetermined speed and/or acceleration limits.

Preferably said locking assembly comprises a control disk mounted for rotation with said shaft and connected to the shaft in such a way that the small or slow predetermined relative movement is permitted between the disc and the shaft, there being additional locking means to lock the shaft against any further rotation actuable in response to movement between said shaft and said control disc in excess of predetermined relative movement, engagement means being provided normally engaging said control disc to prevent or retard movement of the control disc constituting the first mentioned locking means.

Conveniently said engagement means comprise an element moved into engagement with said control disc by means of solenoid.

Preferably the engagement means comprise a pivoted lever pivotally moved into contact with a plurality of ratchet teeth provided on said control disc.

Advantageously said locking means comprise a first member mounted for rotation with the shaft, the second member mounted for rotation about said shaft, the second member being normally connected to the first member by means of a locking element so that the second element normally co-rotates with the shaft on rotation thereof, the rotation of the second element causing locking elements to come into engagement with locking members mounted on the shaft thus preventing further rotation of the shaft.

Preferably the means to sense the acceleration or deceleration of the vehicle comprise an element having a bore therethrough aligned with a light source and the light sensor so that, under ordinary conditions, light shines from the light source passes through the bore to the light sensor, the said element being adapted to topple when subjected to an acceleration or deceleration in excess of a predetermined limit, the said bore then no longer being aligned with the light source and the light sensor.

According to another aspect of this invention there is provided a vehicle belt retractor reel assembly comprising rotatable means to windingly receive the belt, a locking mechanism to lock the rotatable means, a control member to control the locking mechanism and means normally active to retain said control member in position so that if belt is withdrawn from said rotatable means the locking mechanism will lock, means being provided to release said retaining means in response to withdrawal of the belt if the acceleration or deceleration of the vehicle is within predetermined limits.

According to a further aspect of this invention there is provided a vehicle belt retractor reel assembly wherein the means receiving the belt are usually locked to prevent the paying out of any significant length of belt, means being provided to unlock said receiving means in response to the withdrawal or attempted withdrawal of belt under predetermined acceleration or deceleration conditions.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a logic diagram provided for purposes of explanation;

FIG. 4 is a wiring diagram for purposes of explanation;

FIG. 5 is a diagrammatic view of a typical vehicle sensor which may be incorporated in a reel in accordance with the invention.

DETAILED DESCRIPTION OF PREFERRED EMBODIMENTS

Figure 1:
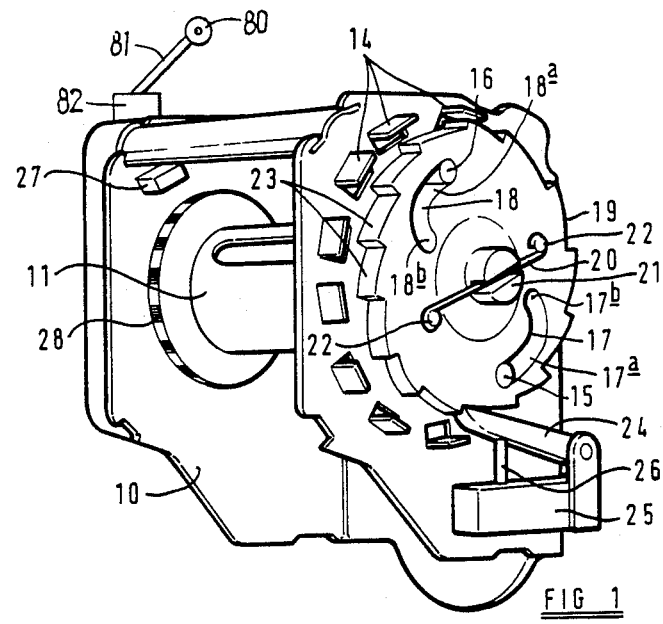
FIG. 1 is a perspective view of a retractor reel in accordance with the invention with an end cover removed for the sake of clarity of illustration.
Figure 2:
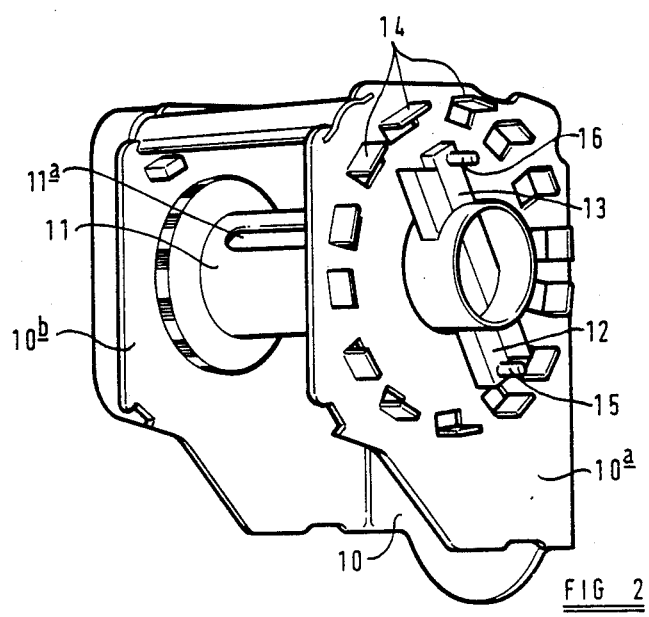
FIG. 2 is a view corresponding to FIG. 1 with the ratchet wheel and sensor assembly removed.

Referring to the drawings, and initially referring to FIGS. 1 and 2 of the drawings, it is to be observed that these figures are corresponding perspective views on a retractor reel in accordance with the invention. It is to be understood that such a retractor reel would normally be provided with a cover to prevent external objects contacting the moving parts of the reel, so that free operation of the movable parts of the reel is not prevented or hindered in any way.

The reel assembly comprises a support 10 which is adapted to be mounted on a motor car body. The support 10 includes a substantially planar plate having two forwardly extending parallel flanges 10a and 10b (FIG. 2). The flanges are parallel and are substantially the same shape. A rotatable reel 11 extends between the flanges and is rotatably supported on the flanges. An aperture 11a is provided extending through the shaft of the reel 11 to facilitate the attachment of one end of the safety belt to the shaft. The safety belt may be wound on to the shaft.

One end of the shaft extends beyond the flange 10a and is provided with a device for locking the shaft to prevent rotation of the shaft relative to the support 10, thus preventing the subsequent extraction of any of the safety belt from the reel assembly. The shaft is provided with a helical spring (not shown) for automatic retraction of the belt when the safety belt is not in use. The helical spring is provided at the end of the shaft opposite to the locking device.

The locking device in this particular embodiment of the invention, comprises various components including two locking pins 12, 13. The locking pins extend, parallel with each other, substantially diametrically through the shaft 11. The construction of the shaft and the way in which the pins are located in the shaft will be described hereinafter in greater detail. The pins are adapted to move in opposite directions to a protruding position in which they can engage with fixed abutment means 14 constituted by a circular array of detents securely mounted on the flange 10a of the support 10. The detents may comprise tabs pressed out of the flange 10a. The array of detents 14 is coaxial with the axis of the shaft 11. When the locking pins 12, 13 engage the detents 14, the shaft 11 is prevented from further rotation.

Each locking pin 12, 13 is provided with a respective guide pin 15, 16, constituted by a pin extending from one end of the locking pin in a direction parallel to the axis of the shaft 11. A control disc 19 is provided which is rotatably mounted on the shaft 11 adjacent the locking pins 12, 13. Guide grooves 17, 18, the side walls of which form guide surfaces to engage the guide pins, are provided in the control disc and the arrangement is such that each of the guide pins 15, 16 is accommodated within a respective guide groove 17, 18. The guide grooves each include an initial arcuate portion 17a, 18a which extends substantially parallel to the outer circumference of the control disc 19, and the guide grooves have terminal arcuate portions 17b, 18b which extend generally inwardly so that the inner ends of the guide groove portions 17b, 18b are closer to the axis of the shaft 11 than the initial arcuate portions 17a, 18a of the guide grooves.

The control disc 19 is connected to the shaft 11 by means of a resilient interconnection, exemplified by a spring element 20 which extends through a groove 21 formed diametrically in the end of an extension of the shaft 11, opposed ends of the spring element 20 being connected to the control disc 19 at diametrically opposed positions 22. The arrangement is such that if the shaft 11 is rotated in such a sense that the safety belt is being paid out from the reel (i.e. in an anti-clockwise sense as generally shown in FIG. 1) the shaft 11 can rotate slightly relative to the control disc 19 which, as will be described hereinafter, is normally locked in position, with the spring element 20 being placed under tension. If the control disc 19 is then released the control disc will, under the influence of the bias imparted thereto by the spring element 20, return to have its original position relative to the shaft 11.

It is to be understood that the guide grooves 17, 18 and the control disc 19 are to positioned and have such a length and shape that when the shaft is turned relative to the control disc initially the guide pins 15, 16 move through the initial arcuate portions 17a, 18a of the guide grooves and thus the locking pins 12, 13 are not moved radially. However, if the shaft 11 moves relative to the control disc 19 to such as extent that the guide pins 15, 16 enter the secondary arcuate portions 17b, 18b of the guide grooves 17, 18, the locking pins are moved radially, the locking pin 12 moving generally upwardly when in the condition illustrated in FIG. 2 and the locking pin 13 moving generally downwardly. The locking pins will be moved to such an extent that the ends of the locking pins will engage corresponding detents 14 thus ensuring that there is no further rotation of the shaft 11 and thus preventing a further length of the seat belt being withdrawn.

The locking pins 12, 13 are illustrated in the retracted or non-locking position in FIG. 2. In this position the centers of gravity of the locking pins are close to the center of the shaft, so that the pins are, at the worst, only slightly influenced by centrifugal force during rotation of the shaft.

The control disc 19 is provided with a plurality of teeth 23 spaced around the circumference of the disc to form a ratchet. A tiltable lever 24 is provided located adjacent the periphery of the control disc 19. The lever can be moved from a position in which it does engage the teeth of the locking disc 19 to a position in which there is no engagement under the influence of the solenoid (not shown) which is contained within a housing 25. The operating arm 26 of the solenoid can be seen in FIG. 1.

The housing 25 contains a control arrangement adapted to control the actuation of the solenoid, and also contains a sensor adapted to sense when the vehicle in which the described retractor reel is fitted is undergoing accelertion or deceleration in excess of a predetermined limit. Various types of sensor can be utilized and one typical sensors will be described in greater detail hereinafter.

The retractor reel presently being described is also provided with means which are responsive to the withdrawal of the belt from the reel. Whilst many relatively simple devices could be used to sense the withdrawal of the belt, in this particular embodiment the sensing means are adapted to determine the speed of withdrawal of the safety belt from the reel 11 or the acceleration of the safety belt as it is withdrawn from the reel 11. In this embodiment the speed or acceleration sensing means comprise an arrangement 27 which incorporates a light source to illuminate the peripheral rim 28 to one end of the reel 11 which is provided with appropriate markings. The assembly 27 also includes a sensor able to sense the presence or absence of the markings, and appropriate circuitry to provide a signal indicative of the speed of rotation of the periphery 28 of the end flange of the reel and/or indicative of the acceleration thereof. This signal is fed to the above-mentioned control circuitry present within the housing 25. Of course many other types of speed/acceleration sensors could be used.

When the seat belt reel, as above described, is in use the solenoid contained within the housing 25 is ordinarily actuated, as indicated in FIG. 1, to urge the tiltable lever 24 upwardly into engagement with the teeth 23 at the periphery of the control disc 19. Thus the control disc 19 is, in the ordinary situation, prevented from rotating in the anti-clockwise direction. If an accident arises a passenger in the motor vehicle will move forwardly relative to the vehicle and the seat belt will become tightened, and the shaft 11 will commence rotation in an anti-clockwise direction. The pins 15, 16 will thus move down the guide slots and, as has been described, the locking pins 12, 13 will thus be brought into engagement with the detents 14, thus preventing further rotation of the shaft 11. It will thus be understood that in the event that an accident arises the shaft 11 will only rotate through a very few degrees before the shaft is firmly locked against any further rotation. Thus a very minimum length of safety belt will be paid out before the shaft 11 is firmly locked in position to prevent any more of the safety belt being paid out.

It will be appreciated that since the toothed control disc 19 is permanently engaged by the locking means there is no need to try and engage the locking means whilst the toothed disc is rotating.

In order to prevent the safety belt from proving to be unacceptable in use, means are provided for enabling the safety belt to be paid out from the reel under certain circumstances. Thus, if a person wishes to move forwardly in a minor vehicle, and the motor vehicle is not in a situation that can be considered to be an accident situation, the person will apply a slight pressure to the seat belt, tending to withdraw the seat belt from the described device. The reel 11 will then rotate slowly. This slow rotation of the seat belt reel will be detected by the detector 27 and an appropriate signal will be supplied to the control circuitry present within the housing 25. The control circuitry present within the housing 25 effectively comprises a sensor which senses whether the motor vehicle is undergoing any acceleration or deceleration in excess of predetermined limits, and if the vehicle is not undergoing such acceleration or deceleration at that time, (because the conclusion can be reached that the vehicle is not undergoing an accident) the solenoid is actuated in such a way that the pivoted lever 24 is disengaged from the teeth 23 provided at the periphery of the control disc 19, thus permitting the control disc 19 to rotate. Thus, during the initial stages of slow withdrawal of the safety belt, a gentle force is applied to the safety belt, thus causing the safety belt to be withdrawn slowly from the reel, and the slow movement is sensed, but initially the disc 19 remains locked in position. The guide pins 15, 16 thus move along the first arcuate portions 17a, 18a of the guide slots 17 and 18. The condition of the vehicle is sensed and if no undue acceleration or deceleration is observed the control disc 19 is released and by virtue of the bias imparted thereto by the spring 20, the disc 19 returns to have its initial position relative to the shaft 11 or, in other words the disc 19 moves to a position such that the pins 15, 16 are located at the ends of the first arcuate portions 17a, 18a of the guide slots remote from the second arcuate portions 17b, 18b. The safety belt may then be withdrawn from the reel to permit the person wearing it to windscreen for example.

The belt withdrawal sensor and the vehicle acceleration or deceleration sensor may effectively control two switches connected in series between a source of current and the solenoid so that both switches must be closed before the solenoid will be actuated.

As has been mentioned above, in the particularly described embodiment of the invention the sensor which is responsive to the withdrawal of the belt from the reel is actually adapted to determine the speed of withdrawal of the safety belt from the reel, or the acceleration of the safety belt as it is withdrawn from the reel. One advantage of such an arrangement is that if the vehicle acceleration sensor fails to operate, for some reason, if the rate of withdrawal of the belt is relatively rapid or if the acceleration of the belt as it is withdrawn is above a predetermined limit, the control circuitry will not actuate the solenoid to disengage the pivoted lever 24 from the teeth 23.

It will be appreciated that if during withdrawal of the safety belt, either the speed of withdrawal sensor 27 or the vehicle acceleration/deceleration sensor contained within the housing detect either a too-rapid withdrawal of the safety belt or an acceleration or deceleration of the vehicle above the predetermined limits the solenoid is immediately actuated to return the pivoted lever 24 to such a position that it engaged the teeth 23 provided at the periphery of the disc 19. The disc 19 will thus be prevented from moving further and the guide pins 15, 16 will move entirely along the length of the guide slots 17, 18 thus forcing the locking pins 12, 13 into engagement with the detents 14.

When the safety belt is released, the safety belt is rewound onto the spool 11 by means of the described spring. During this movement the control disc 19 will rotate in a clockwise direction as seen in FIG. 1 and the lever 24 will move across the teeth 23 in a ratchet like manner.

FIG. 3 shows a logic diagram of the control circuitry contained within the housing 25, which is self explanatory.

FIG. 4 is a simplified circuit diagram. The lead 30 is connected to the optical sensor 27 and then passes through a time delay circuit 31 to an "AND" gate 32 the other input 33 of which receives the signal from the vehicle condition sensor only if the vehicle is not subjected to an acceleration or deceleration in excess of a predetermined limit. The output of the "AND" gate 32 is fed directly to the solenoid 34.

Whilst one circuit diagram has been provided it is to be appreciated that many alternative circuits may be devised, and indeed the device may be controlled by means of an appropriately programmed microprocessor.

FIG. 5 illustrates, by way of example, one form of sensor which could be utilized to sense vehicle acceleration or deceleration. The sensor comprises a symmetrical element 40 which may be made of a metal such as brass. The element consists of a cylindrical base 41 which supports an enlarged generally cylindrical head 42. The element stands in a recess on its base and is thus top-heavy. A vertical axial bore 43 is provided which extends through the element and a light source 44 is located above the element, there being a light sensor 45 located beneath the element. The element is supported in a recess in an appropriate housing, the base standing on the platform, the platform being apertured to provide a line of sight from the light source 44, through the bore 43 to the light sensor 45. The light sensor may be in the form of a photo diode or photo transistor, incorporated in an appropriate manner in the control circuitry. The recess in which the element 40 is accommodated is large enough to allow the element to topple and the element will topple in this way when a vehicle in which the sensor is fitted is subjected to an acceleration or deceleration exceeding a predetermined limit. It will be appreciated that after the acceleration or deceleration has terminated the element will return to the illustrated upright position. When the element has toppled, light from the light source 44 will no longer fall on the light detector 45, since the axis of the bore 43 is no longer aligned with the light source and light sensor and thus the output of the light detector 45 is directly indicative as to whether the vehicle is or is not being subjected to an acceleration or deceleration in excess of a predetermined limit.

Whilst the invention has been described above by way of example with reference to one preferred embodiment it is to be appreciated that many modifications may be affected.

For example, whilst an opto-electronic arrangement has been disclosed for sensing the speed of withdrawal of the belt from the reel to control the release or non-release of the control disc 19 a mechanical arrangement could be provided. Also, whilst the control disc 19 has been illustrated in the form of a ratchet wheel cooperating with a pivotable lever 24 many alternative arrangements could be utilized. The control disc 19 could be acted on by a brake or by an element engaging recesses in or abutments projecting from the side face of the control disc 19. Whilst one particular way of connecting the control disc 19 to the shaft 11 has been illustrated many alternative arrangements could be adopted. Again, whilst one particular mechanism for locking the shaft in position has been illustrated, again many alternative arrangements could be utilized.

Figure 6:
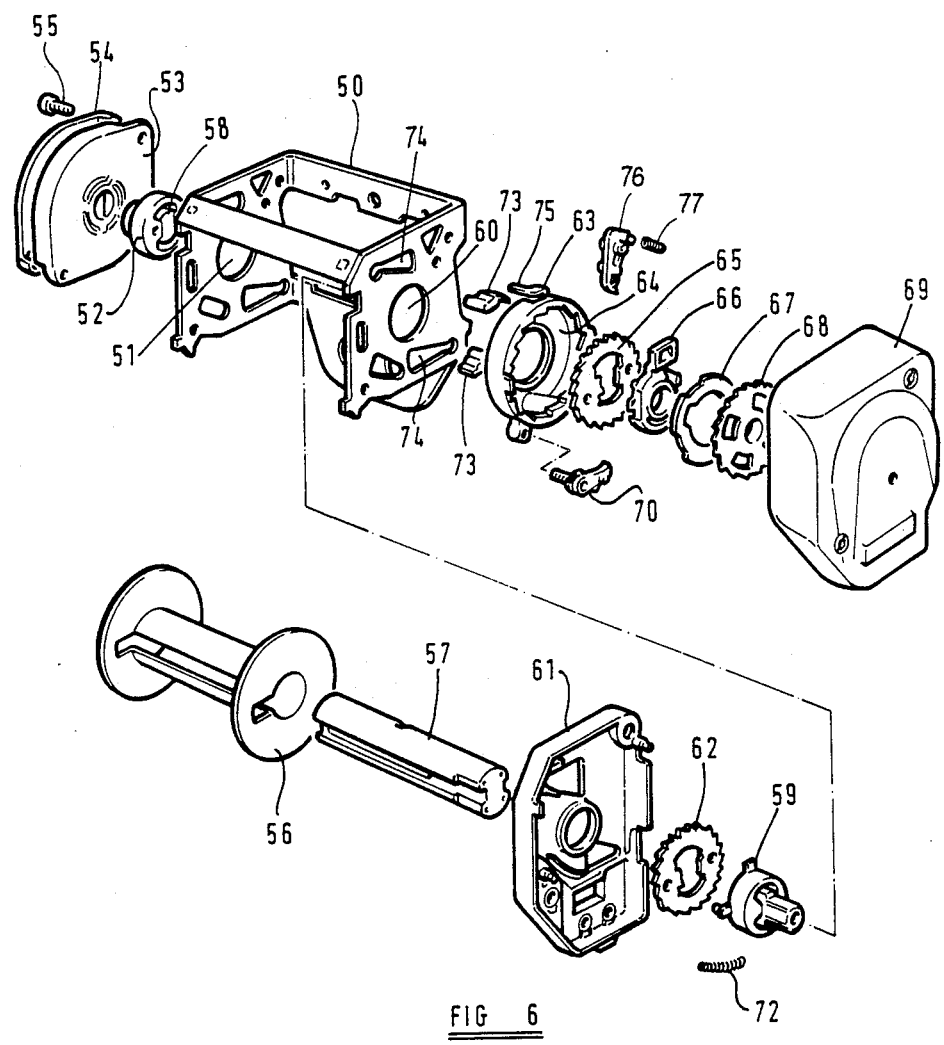
FIG. 6 is an exploded view of another embodiment of the invention.

FIG. 6 illustrates another embodiment of the invention.

A metal housing 50 is provided which defines apertures to receive the various components to be described. One side wall of the housing defines an aperture 51 which accommodates a bearing 52. Part of the bearing is inserted into a housing 53 which contains a helical spring adapted to impart a rotary movement to the bearing 52. A cover 54 is retained on the housing 53 by means of screws 55.

A bobbin or reel 56 is provided which is mounted on a shaft 57. One end of the shaft is received within an appropriate recess 58 formed in the bearing so that the bearing rotatably supports that end of the shaft. The other end of the shaft is inserted in a corresponding bearing 59 which is mounted in another aperture 60 formed in the metal housing 50.

The bobbin or reel 56 is provided to have the seat belt wound onto it, and the spring in the housing 53 tends to wind the belt onto bobbin or reel 56.

A cover 61 is provided located between the part of the housing defining the aperture 60 and the bobbin 56. A toothed locking wheel 62 is mounted on the shaft 57 for rotation with the shaft between the housing 61 and the bearing 59. Wheel 62 cannot rotate relative to the shaft 57.

A plastic control element 63 is located adjacent the exterior of the housing 50, one face of the control element defining a recess 64 which accommodates a second toothed locking wheel 65, two inertia elements 66, 67 sensitive to movement of the belt stored on the bobbin 56, and a further toothed wheel 68. The interior of the recess 64 is toothed. A housing 69 is provided which effectively covers and protects these components. The components are mounted co-axially with the shaft for rotation about the shaft axis. The wheels 65, 68 are keyed to the shaft and cannot rotate relative to the shaft. Control element 63 can rotate relative to the shaft.

Mounted on the control element 63 is a tiltable member 70 which is actuated by a solenoid corresponding to the solenoid 34 of the above described embodiment. The tiltable member 70 is adapted to engage the further toothed wheel 68 and when the toothed wheel 68 is thus engaged the control element 63 will be constrained to rotate with the shaft 57.

A spring 72 is provided to bias the control element 63 to an initial starting position.

Two locking tabs 73 are provided which are located in appropriately located and configured apertures 74 in the part of the housing 50 that defines the aperture 60. The locking tabs are pivotably mounted in position. The control element 63 has two apertures formed with projecting wings 75 formed in the rear wall and part of the side wall which, on rotation of the control element 63 engage the locking tabs 73, moving the locking tabs 73 pivotally in such a way that part of each of the locking tabs extends into contact with the first locking wheel 62 and, through the aperture formed in the control member 63, with the second locking wheel 65. The arrangement may be such that the control element 63 rotates by a predetermined amount before the locking tabs engage the wings 75. Alternatively the wheel 68 may be mounted on the shaft in such a way that the shaft can rotate by a small amount even when the wheel 68 is locked by the member 70.

Thus, in operation of the above described device, the member 70 is normally in engagement with the toothed wheel 68. If any belt is withdrawn from the reel the control member 63 is constrained to rotate in synchronism with the rotation of the shaft. This rotation of the control member 63 causes the projecting wings 75 to engage the locking tabs 73, bringing the tabs into engagement with the toothed locking members 62, 65, thus preventing the shaft from rotating further.

As in the above described embodiment the extraction of a short length of belt from the reel will be sensed in some way and if it is determined that the vehicle is not under accident conditions the member 70 will be released, thus permitting a further length of belt to be withdrawn. The spring 77 and the associated lever 76 are so designed and located that the inertia mass, constituted by the member 67 and the element 66, is usually biased to a position, relative to the wheels 65 and 68, such that the pivoted lever 76, doesn ot engage the toothed interior of the recess 64 of the plastic control element 63.

If an accident occurs shortly after a person wearing the seat belt has moved slightly forward in their seat, for example to clean the windhshield of the motor vehicle, unless some further means were provided to relock the shaft the person would be thrown forwardly and would not have any benefit from wearing the safety elt. It is for this reason that the above described conventional inertia device is provided.

The most significant difference between the present invention and the prior art is that, in the prior art a control element that is normally free to rotate is prevented from rotating under accident conditions whereas, in the present invention, the control element is normally prevented from rotating, but can be released, in certain circumstances, when accident conditions do no prevail.

It is to be understood that in other embodiments of the invention there may be no control disc 19 or toothed wheel 68. Thus, for example, the reel or shaft onto which the belt is wound may be engaged directly by a locking member, such as a locking pin driven by a solenoid. The arrangement will be such that a short length of belt may be paid out before the locking pin is released so that the movement of the belt (or the associated reel or shaft) can be detected. It is envisaged, however, that in other embodiments the mere application of tension to the belt, tending to withdraw the belt, may be sensed.

Thus, in certain embodiments of the invention, sensors may be provided adapted to measure the tension applied to the belt. Such sensors may be constituted by a roller 80 over which part of the belt passes, the roller being secured to a pivotally mounted arm 81 so that, as tension in the belt increases, the arm 81 pivots. A transducer 82 can determine the degree of pivoting of the arm, and can thus effectively respond to a predetermined tension applied to the belt. Many other ways of determining tension applied to the belt can be utilized. In such an embodiment of the invention the sensor that senses the tension applied to the belt will provide a signal when the appropriate tension is established, and then, if the vehicle acceleration/deceleration sensor indicates that the vehicle is not under going an accident, a normally locked part of the reel will be released to permit a length of the belt to be paid out.

What is claimed is:

1. A retractor reel assembly for a vehicle safety belt in a vehicle comprising: a reel housing and a reel disposed in said reel housing; rotatable means disposed within said housing for automatically winding the safety belt when the safety belt is not in use; locking means disposed within said housing for locking said rotatable means to limit unwinding of the safety belt, said locking means normally being engaged with said rotatable means; sensing means for sensing the acceleration or deceleration of the vehicle; and releasing means disposed in said housing and operatively connected to said sensing means for releasing said locking means in response to withdrawal of a length of the belt from said reel assembly and said releasing means releasing the belt only when the acceleration or deceleration of the vehicle is within predetermined limits.

2. A retractor reel assembly according to claim 1, further comprising a tension sensor supported by said housing wherein said tension sensor is adapted to sense tension applied to the belt during an attempted withdrawal of the belt from said reel assembly.

3. A retractor reel assembly according to claim 1, wherein said rotatable means are selectively locked in position to prevent withdrawal of any belt from said rotatable means.

4. A retractor reel assembly according to claim 1, wherein said rotatable means is rotatable only to a limited extent.

5. A retractor reel assembly according to claim 4, further comprising a sensor disposed in said housing responsive to withdrawal of the belt; and said releasing means responsive to said sensor to release said locking means.

6. A retractor reel assembly according to claim 5, wherein said sensor comprises mean for determining one of the speed or acceleration of withdrawal of the belt and said releasing means being responsive to said means for determining one of the speed or acceleration of withdrawal of the belt.

7. A retractor reel assembly according to claim 1, wherein said rotatable means further comprises a control disc and a shaft; said locking means further comprises engagement means and shaft locking means, wherein said control disc is mounted for rotation with said shaft and connected to said shaft so that small predetermined relative movement is permitted between said disc and said shaft, said shaft locking means being operatively adapted to lock said shaft against any further rotation and being actuable in response to movement between said shaft and said control disc in excess of a predetermined relative movement, and said engagement means being movable into an engaging position with said control disc to prevent or retard movement of said control disc.

8. A retractor reel assembly according to claim 7, wherein said control disc is provided with a plurality of ratchet teeth and said engagement means further comprises an element and a solenoid, wherein said element is moved into contact with said ratchet teeth bymeans of said solenoid.

9. A retractor reel assembly according to claim 8, wherein said element is a pivoted lever pivotally moved into contact with said ratchet teeth.

10. A retractor reel assembly according to claim 1, wherein said rotatable means includes a shaft and said locking means includes a firs tmember, a second member, at least one locking element and at least one locking member, wherein said first member is mounted for rotation about said shaft, said second member being normally connected to said first member by said at least one locking element so that said second element normally co-rotates with the shaft on rotation thereof, the rotation of said second element causing said at least one locking element to come into engagement with said at least one locking member mounted on said shaft whereby preventing further rotation of said shaft.

11. A retractor reel assembly according to claim 1, wherein said sensing means comprises an element having abore therethrough; a light source and a light sensor, wherein said bore is aligned with said light source and said light sensor so that, under ordinary conditions, light that shines from said light source passes through said bore to said light sensor, said element being adapted to topple when subjected to an acceleration or deceleration in excess of a predetermined limit whereby said bore is no longer aligned with said light source and said light sensor.

12. A vehicle belt retractor reel assembly for a vehicle safety belt in a vehicle comprising:

a housing and a reel disposed in said housing; rotatable means disposed in said housing for windingly receiving the belt; locking means disposed in said housing for locking said rotatable means; control means disposed in said housing for controlling said locking means; retaining means disposed in said housing and being normally active for retaining said control means so that if the belt is withdrawn from said rotatable means said locking means will lock; sensor means for sensing the acceleration or deceleration of the vehicle and said sensor means being operatively connected to said reel assembly and releasing means connected of releasing said retaining means in response to withdrawal of the belt if said sensor means senses the acceleration or deceleration of the vehicle is within predetermined limits.

* * * * *